(12) United States Patent
Demopoulos

(10) Patent No.: US 8,973,143 B2
(45) Date of Patent: Mar. 3, 2015

(54) METHOD AND SYSTEM FOR DEFEATING DENIAL OF SERVICE ATTACKS

(71) Applicant: The Barrier Group, LLC, Ramsey, MN (US)

(72) Inventor: Robert J. Demopoulos, Champlin, MN (US)

(73) Assignee: The Barrier Group, LLC, Ramsey, MN (US)

( * ) Notice: Subject to any disclaimer, the term of this patent is extended or adjusted under 35 U.S.C. 154(b) by 0 days.

(21) Appl. No.: 14/165,900

(22) Filed: Jan. 28, 2014

(65) Prior Publication Data

US 2014/0215599 A1    Jul. 31, 2014

Related U.S. Application Data

(60) Provisional application No. 61/757,292, filed on Jan. 28, 2013.

(51) Int. Cl.
  *G06F 11/00* (2006.01)
  *H04L 29/06* (2006.01)
  *G06F 21/55* (2013.01)

(52) U.S. Cl.
  CPC .......... *H04L 63/1458* (2013.01); *H04L 63/1441* (2013.01); *G06F 21/55* (2013.01)
  USPC .......................................... 726/23

(58) Field of Classification Search
  CPC ............. H04L 63/141; H04L 63/1141; H04L 63/1458; H04L 63/02; H04L 9/002; H04L 63/1433
  USPC ........................... 726/11, 22, 23, 25; 709/225
  See application file for complete search history.

(56) References Cited

U.S. PATENT DOCUMENTS

| | | | |
|---|---|---|---|
| 7,028,179 B2 | 4/2006 | Anderson et al. | |
| 7,107,619 B2 | 9/2006 | Silverman | |
| 7,162,740 B2 | 1/2007 | Eastlake et al. | |
| 7,707,305 B2 | 4/2010 | Afek et al. | |
| 7,818,795 B1 * | 10/2010 | Arad | 726/13 |
| 7,925,766 B2 | 4/2011 | Jayawardena et al. | |
| 7,953,855 B2 | 5/2011 | Jayawardena et al. | |
| 7,992,208 B2 * | 8/2011 | Khandani et al. | 726/25 |
| 8,248,946 B2 | 8/2012 | Chao et al. | |
| 8,667,585 B2 * | 3/2014 | Yoon et al. | 726/22 |
| 2010/0235902 A1 * | 9/2010 | Guo et al. | 726/12 |
| 2011/0131654 A1 * | 6/2011 | Taneja et al. | 726/23 |
| 2012/0117646 A1 * | 5/2012 | Yoon et al. | 726/22 |
| 2014/0109225 A1 * | 4/2014 | Holloway et al. | 726/23 |

* cited by examiner

*Primary Examiner* — Samson Lemma
(74) *Attorney, Agent, or Firm* — Skaar Ulbrich Macari, P.A.

(57) ABSTRACT

Software, systems and methods for defeating DoS and DDoS attacks according to certain embodiments include detecting a DoS/DDoS attack, connecting to attacking node(s) by allowing a network handshake to complete between a network connected device and the attacking nodes. Then the network connected device under attack drops the traffic from the attacking node(s) rather that rejecting it. The acceptance and dropping is repeated until the attack is defeated.

20 Claims, 2 Drawing Sheets

METHOD AND SYSTEM FOR DEFEATING DENIAL OF SERVICE ATTACKS

PRIORITY

This application claims the priority benefit of U.S. Provisional Application No. 61/757,292 filed on Jan. 28, 2013, which is hereby incorporated herein by reference in its entirety.

FIELD

The present invention relates, in general, to network connected devices communicating via TCP/IP protocols, and, more particularly, to software, systems and methods employed by such devices to effectively defeat denial of service and distributed denial of service attacks.

BACKGROUND

TCP/IP protocol is the prevalent methodology for nodes to communicate with each other over the internet. Typically a TCP/IP connection between two nodes is established with a so-called three way handshake and is well understood, so it will not be repeated here in detail. However, by way of summary, in a first frame of a connection, the initiating node sends a SYN request to the target node. The target node responds in the second frame with a SYN-ACK to acknowledge the request of the client for synchronization. Then in the third frame, the initiating computer sends a response ACK. These three frames establish the connection. Thereafter data packets are exchanged and the session is terminated by the transmission of a FIN.

Every day nodes connected to the Internet throughout the internet are attacked and disabled through the use of the TCP/IP protocol by attackers utilizing what is known as a "Denial of Service" (DoS) or a "Distributed Denial of Service" (DDoS) attacks. These attacks share the following characteristics:

- Massive amounts of network traffic sent from 1 or more IP addresses in a short period of time.
- Multiple IP addresses around the world join in the attack
- After a period the attacked network node (victim) can no longer cope with the large traffic volume and it fails or becomes disabled.

Current attempts at solving the DoS/DDoS attack problem depend on simply blocking the attack traffic (not establishing a connection) as quickly as possible after the attack is recognized. This blocking is typically accomplished by the node under attack sending a network reset to each of the attacking nodes in the second frame, which consumes the target or victims network resources, thereby compounding the attack. In any event, when the victim is under attack from hundreds of thousands of attack IP address it is virtually impossible to defeat these attacks using a blocking methodology. Alternatives such as deflecting or re-directing the incoming packets to a so-called black hole usually fare no better because the attack node is free to continue its attack on the victim node. Thus there is a need to provide an effective counter-measure to these attacks.

SUMMARY

Software, systems and methods for defeating DoS and DDoS attacks according to certain embodiments include detecting a DoS/DDoS attack, connecting to attacking node (s) by allowing a network handshake to complete between a network connected device and the attacking nodes. Then the network connected device under attack drops the traffic from the attacking node(s) rather that rejecting it. The acceptance and dropping is repeated until the attack is defeated.

According to certain embodiments, a network connected device connected to the Internet and configured to defeat a Denial of Service (DoS) or a Distributed Denial of Service (DDoS) attacks includes a microprocessor, memory coupled to the microprocessor, and a network interface coupled to the microprocessor. The microprocessor is configured to: receive a SYN request from an attack node as part of a TCP/IP connection protocol, send a SYN-ACK response to the attack node as part of the TCI/IP protocol, receive an ACK response from the attack node as part of the TCI/IP protocol to establish a connection between the network connected device and the attack node; and dropping all data packets transmitted by the attack node after the connection between the attack node and the network connected device has been established.

According to further embodiments, a method of defeating a DoS or DDoS attack on a network connected device connected to the Internet includes evaluating by a processor whether a network node is attempting the DoS or DDoS attack on a network connected device; receiving a SYN request from an attack node as part of a TCP/IP connection protocol; sending a SYN-ACK response to the attack node as part of the TCI/IP protocol; receiving an ACK response from the attack node as part of the TCI/IP protocol, thereby establishing a connection between the network connected device and the attack node. Then the network connected device drops all data packets transmitted by the attack node after the connection between the attack node and the network connected device has been established.

According to additional embodiments, a method of defeating a DoS or DDoS attack on a network connected device connected to the Internet includes completing a TCP/IP connection between a first attacking node and the network connected device followed by dropping all data packets from the first attacking node subsequent to completing the TCP/IP connection between the first attacking node and the network connected device. A TCP/IP connection is established between a second attacking node and the network connected device and then all data packets from the second attacking node are dropped subsequent to completing the TCP/IP connection between the second attacking node and the network connected device.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
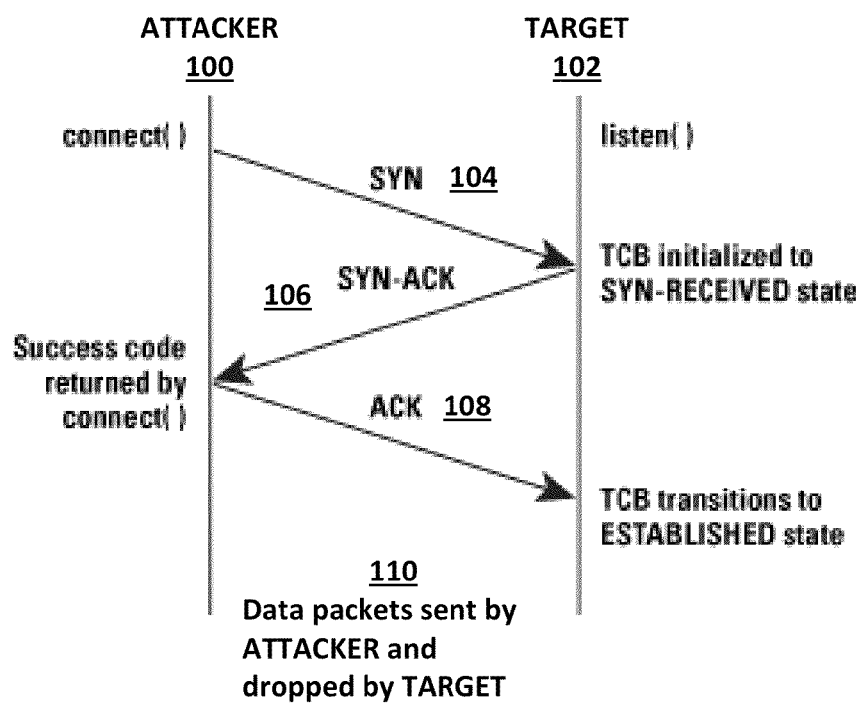
FIG. 1 is a diagram of a TCP/IP connection according to certain embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The various features or aspects discussed herein can also be combined in additional combinations and embodiments, whether or not explicitly discussed herein, without departing from the scope of the invention.

There are many known ways to detect whether a given note is a DoS or DDoS "attack" node. These ways include looking at large/unusual traffic volume from a specific IP address making requests to the network node and/or performing a network and connection threshold analysis as is known in the art. The present invention is not limited to any specific detection method or mechanism. Thus any detection method or mechanism can be employed.

The invention can be configured as a network connected device. Such device includes a network interface. The network interface is configured to enable communication with a communication network (e.g. the Internet or World Wide Web), using a wired and/or wireless connection. The device includes a microprocessor and memory. The memory may include one or more non-volatile storage devices and/or one or more volatile storage devices (e.g., random access memory (RAM)).

Computer readable program code is stored in the memory, such as, but not limited to magnetic media (e.g., a hard disk), optical media (e.g., a OVO), memory devices (e.g., random access memory, flash memory), etc. The computer readable program code is configured such that when executed by a processor, the code causes the network connected device to perform the steps of the invention described herein. In other embodiments, the device is configured to perform steps described below without the need for code.

Examples of network connected devices include network firewall appliances, switches, routers, general purpose computers, tablets, smart phones and/or other computing devices that can execute the steps of the invention described herein.

Rather than block the traffic incoming from attacking node (s), the computing system(s) corresponding to the network node(s) under attack allow a network handshake to complete with the attacking nodes. Then the node under attack effectively blocks the traffic via dropping the traffic rather that rejecting it.

A network handshake according to this method and the system are illustrated in FIG. 1. The Attacker 100 initiates a connection request with a Target node 102 by sending a SYN request 104. Rather than ignoring or blocking the SYN request 104, the Target node 102 responds with the SYN-ACK frame 106 of the three-way handshake. The Attacker node 100 then proceeds according to protocol with an ACK 108 as the third frame. Thus, the Target 102 establishes a connection with the attacker 100 so that the attacker node 100 behaves as through it achieved a valid connection to the target 102. After establishing the connection, any data packet sent by the attacker 100 are dropped by the target 110.

Figure 2:
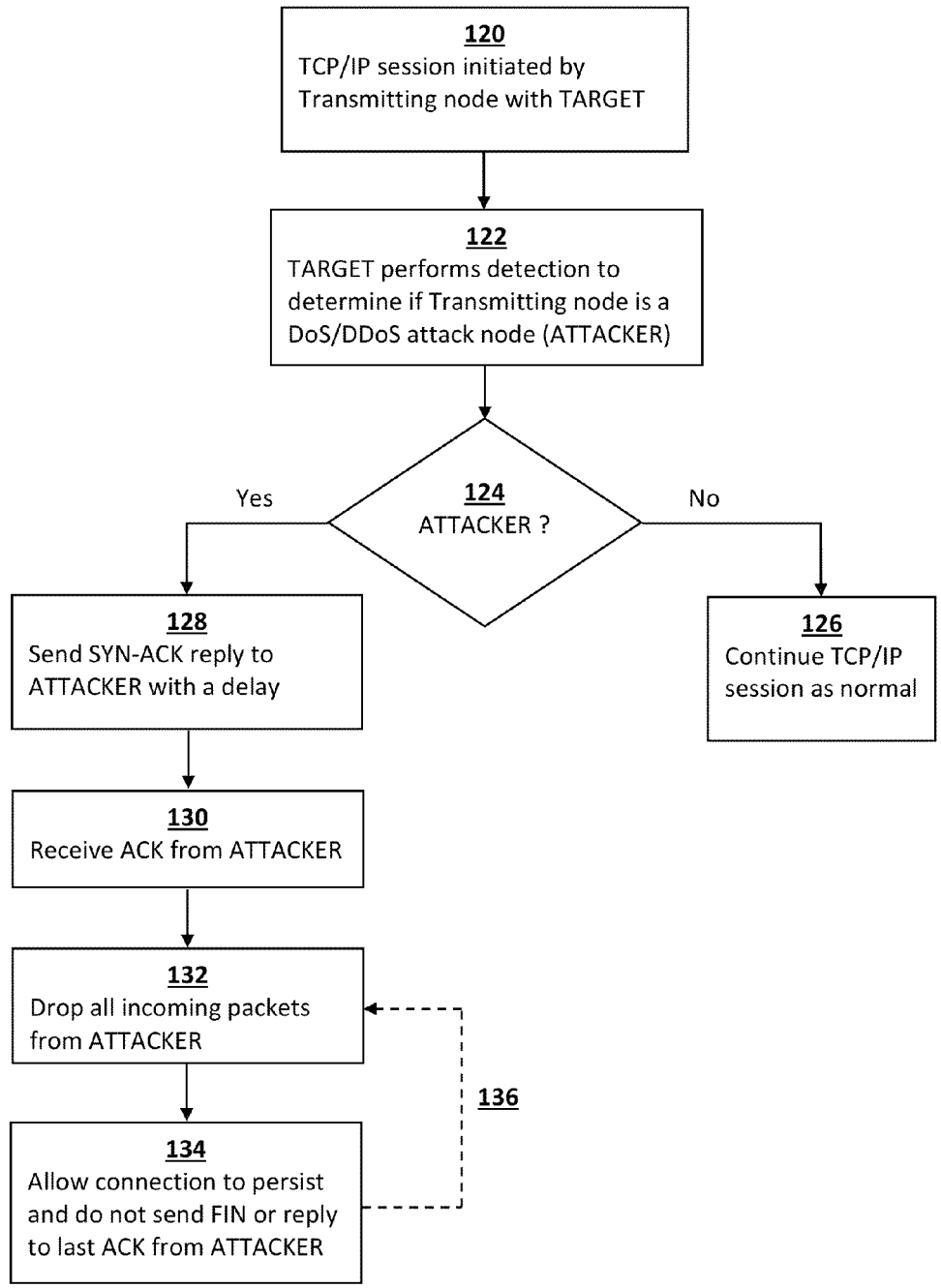
FIG. 2 is a diagram of a DoS/DDoS defeating method according to certain embodiments of the invention.

FIG. 2 illustrates the process of the DoS/DDoS defeating system and process in greater detail according to certain embodiments. A TCP/IP session is initiated 120 by a transmitting node with a Target network connected device. The target network connected device in this embodiment is configured according to carry out the steps of the Target system in this embodiment of the invention.

The Target node then performs a detection analysis 122 on the Transmitting node to determine if the Transmitting node is a known DoS/DDoS attack node or otherwise attempting to initiate or participate in a DoS/DDoS attack. Such determination 124 can be carried out using any suitable means for evaluating an attacker known to those of skill in the art.

If the Transmitting node is not determined to be an Attacker node, then the TCP/IP session is continued 126 according to normal protocols.

If the transmitting node is determined to be an Attacker node, then the Target device sends a SYN-ACK reply 128 to the Attacker's SYN request rather than a reset request or diverting the request to a black hole node. This SYN-ACK response causes the Attacker to believe that a connection is proceeding normally, so the Attacker transmits its ACK 130 as would normally occur as the third part of the handshake. Thus, the connection between the attacker and Target is established.

In an additional aspect, the Target could delay its reply of the SYN-ACK 128 to the Attacker. In a preferred embodiment, the delay would be from two to four minutes. The delay slows down the handshake process while consuming the Attacker's resources.

After establishing the connection following step 130, the Target network connected device drops all incoming packets from the Attacker 132. However, the connection is not terminated by sending a FIN. Instead, the connection is allowed to persist 134 and all packets from the Attacker continued to be dropped. Because the network handshake is allowed to complete instead of receiving a rejection, the Attacker's connection to the Target node under attack must wait until the connection times out (typically a few seconds), before being forced to attempt a retransmission. The retransmission is allowed to complete because the connection is still active and the transmitted packets are dropped again as described above. This dropping process repeats several times 136 in a given blocking process, typically about 10 times.

The result of the system and method as described above is that the attackers' network traffic is used against it, consuming each Attacker's network resources and not those of the Target node under attack, thereby defeating the attacker and protecting the attacked target system or device.

The attacking IP address may represent one or more computer systems. Multiple specific requesting IP addresses can be simultaneously evaluated for attack characteristics.

The entire defense process is duplicated for all connections from an attacker. A given attacker can have many unique connections to the Target and there can be many different attacker nodes involved in an overall attack event.

The invention described herein is accurate, effective, lightweight and operates at high-speed compared to convention solutions and devices for addressing DoS and DDoS attacks. In one example involving 100,000 unique attacker nodes, each using 100 connections, there would be 10 Million Connections, each consuming 150 bytes of connection data. The total network time consumed to defeat the attack according the invention would be a mere 75 seconds given a target victim node operating with a 20 MbS Internet connection.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A network connected device connected to the Internet and configured to defeat a Denial of Service (DoS) or a Distributed Denial of Service (DDoS) attacks, comprising:
    a microprocessor;
    memory coupled to the microprocessor; and
    a network interface coupled to the microprocessor,
    wherein the microprocessor is configured to:
        receive a SYN request from an attack node as part of a TCP/IP connection protocol;
        send a SYN-ACK response to the attack node as part of the TCP/IP protocol after a delay period expires, the delay period occurring between the receipt of the SYN request from an attack node and the sending of the SYN-ACK response to the attack node;
        receive an ACK response from the attack node as part of the TCP/IP protocol to establish a connection between the network connected device and the attack node; and
        dropping all data packets transmitted by the attack node after the connection between the attack node and the network connected device has been established.

2. The device of claim 1, wherein the microprocessor is further configured to detect whether a network node is attempting a DoS or DDoS attack on the network connected device.

3. The device of claim 1, wherein the microprocessor is further configured to:
    accept a retransmission of the data packets transmitted by the attack node after the connection between the attack node and the network connected device has been established; and
    drop all the retransmitted data packets.

4. The device of claim 3, wherein the microprocessor is further configured to repeat the step of dropping the retransmitted data packets until the attacking node ceases its attack.

5. The device of claim 1, wherein the microprocessor is further configured to repeat the steps of completing the connection with the attacking node and dropping all post-connection data packets for a plurality of attacking nodes.

6. The device of claim 1, wherein the network connected device is a network firewall appliance.

7. The device of claim 1, wherein the network connected device is a switch.

8. The device of claim 1, wherein the network connected device is a router.

9. The device of claim 1, wherein the network connected device is a computing device.

10. A method of defeating a DoS or DDoS attack on a network connected device connected to the Internet, the network connected device including a processor, memory and a network interface, the method comprising:
    evaluating by the processor whether a network node is attempting the DoS or DDoS attack on a network connected device;
    receiving a SYN request from an attack node as part of a TCP/IP connection protocol;
    sending a SYN-ACK response to the attack node as part of the TCP/IP protocol after a delay period expires, the delay period occurring between the receipt of the SYN request from an attack node and the sending of the SYN-ACK response to the attack node;
    receiving an ACK response from the attack node as part of the TCP/IP protocol, thereby establishing a connection between the network connected device and the attack node;
    dropping by the network connected device all data packets transmitted by the attack node after the connection between the attack node and the network connected device has been established.

11. The method of claim 10, further comprising:
    accepting a retransmission of all data packets transmitted by the attack node after the connection between the attack node and the network connected device has been established; and
    dropping all the retransmitted data packets.

12. The method of claim 11, further comprising repeating the step of dropping the retransmitted data packets until the attacking node ceases its attack.

13. The method of claim 10, further comprising repeating the steps of completing the connection with the attacking node and dropping all post-connection data packets for a plurality of attacking nodes.

14. The method of claim 10, further comprising configuring the network connected device as a network firewall appliance.

15. The method of claim 10, further comprising configuring the network connected device as a switch.

16. The method of claim 10, further comprising configuring the network connected device as a router.

17. The device of claim 1, wherein the microprocessor is further configured to allow the connection between the network connected device and the attack node to persist without sending a TCP/IP protocol reply to the ACK response sent by the attack node.

18. The device of claim 1, wherein the delay period has a duration in a range of two to four minutes.

19. The method of claim 10, further comprising allowing the connection between the network connected device and the attack node to persist without sending a TCP/IP protocol reply to the ACK response sent by the attack node.

20. The method of claim 10, wherein the delay period has a duration in a range of two to four minutes.

* * * * *